(12) United States Patent  
Stewart

(10) Patent No.: US 6,216,463 B1  
(45) Date of Patent: Apr. 17, 2001

(54) METHOD OF COMBINING WASTE WATER TREATMENT AND POWER GENERATION TECHNOLOGIES

(76) Inventor: Leonard Leroux Stewart, 4358 Chico Ave., Santa Rosa, CA (US) 95407

( * ) Notice: Subject to any disclaimer, the term of this patent is extended or adjusted under 35 U.S.C. 154(b) by 0 days.

(21) Appl. No.: 08/969,712

(22) Filed: Nov. 14, 1997

Related U.S. Application Data

(63) Continuation of application No. 08/545,110, filed on Oct. 19, 1995, now abandoned.

(51) Int. Cl.[7] .................................................. F03G 7/00
(52) U.S. Cl. .......................... 60/641.2; 210/170; 210/747
(58) Field of Search .......................... 60/641.2; 210/747, 210/710

(56) References Cited

U.S. PATENT DOCUMENTS

| | | | | |
|---|---|---|---|---|
| 2,962,599 | * | 11/1960 | Pirkey | 290/4 |
| 4,052,858 | * | 10/1977 | Jeppson | 60/648 |
| 4,443,707 | * | 4/1984 | Scieri et al. | 290/4 |
| 4,542,625 | * | 9/1985 | Bronicki | 60/641.2 |
| 5,400,598 | * | 3/1995 | Moritz et al. | 60/641.2 |
| 5,484,231 | * | 1/1996 | Cannan et al. | 405/128 |

OTHER PUBLICATIONS

Goddard & Goddard Engineering, "Feasibility Study of Deep Injection Disposal of Excess Wastewater from the Lake County Southeast Regional Wastewater Facility and Evaluation of Potential for Electrical Generation," Feb. 14, 1991, pp. 1–32, Appendix, pp. 1–16.

Bechtel Civil, Inc., "Evaluation of Wastewater Conveyance Systems to the Geysers and the Ocean," Jul., 1986, Sections 1–7.

* cited by examiner

Primary Examiner—Noah P. Kamen  
(74) Attorney, Agent, or Firm—William C. Milks, III

(57) ABSTRACT

Applicant's preferred embodiment utilizes municipal waste water effluent to replenish a depleted geothermal field. Condensate produced by expanding steam produced in the geothermal field through a steam turbine-generator is pooled with cooked water collected from the field, and then directed through a penstock from a higher elevation to a lower elevation where further energy is extracted through a traditional hydroelectric generator. The cooked water and condensate may be treated to produce potable water and/or distributed for public consumption either before or after it is directed to the hydroelectric turbine generator. The effluent is pumped up to the geothermal field during off-peak periods of electric consumption, and hydroelectric power generation is accomplished during periods of peak electric demand. A fraction of the effluent may be used as cooling water for the steam turbine and its associated condenser before injection into the geothermal field.

16 Claims, 2 Drawing Sheets

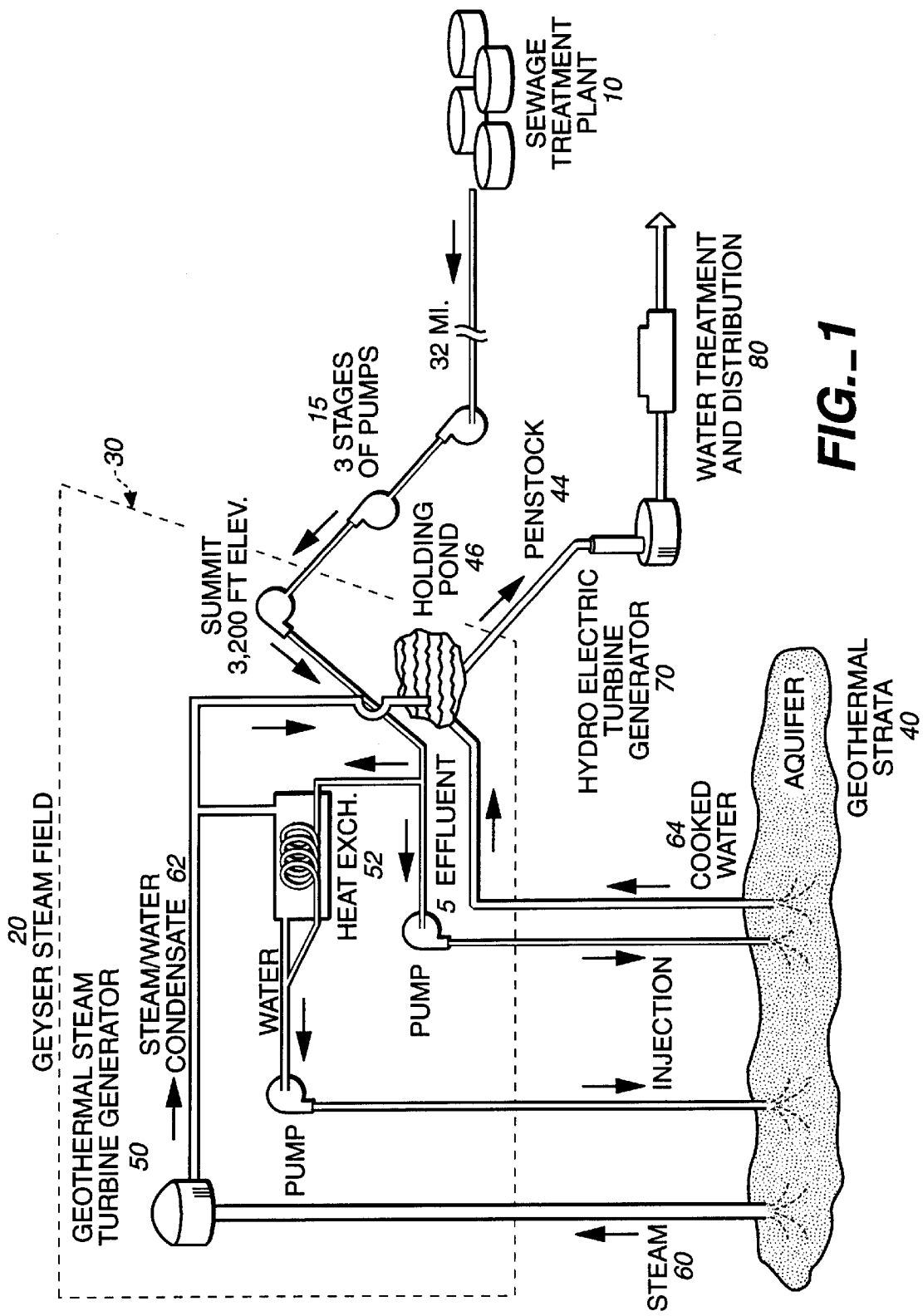
FIG._1

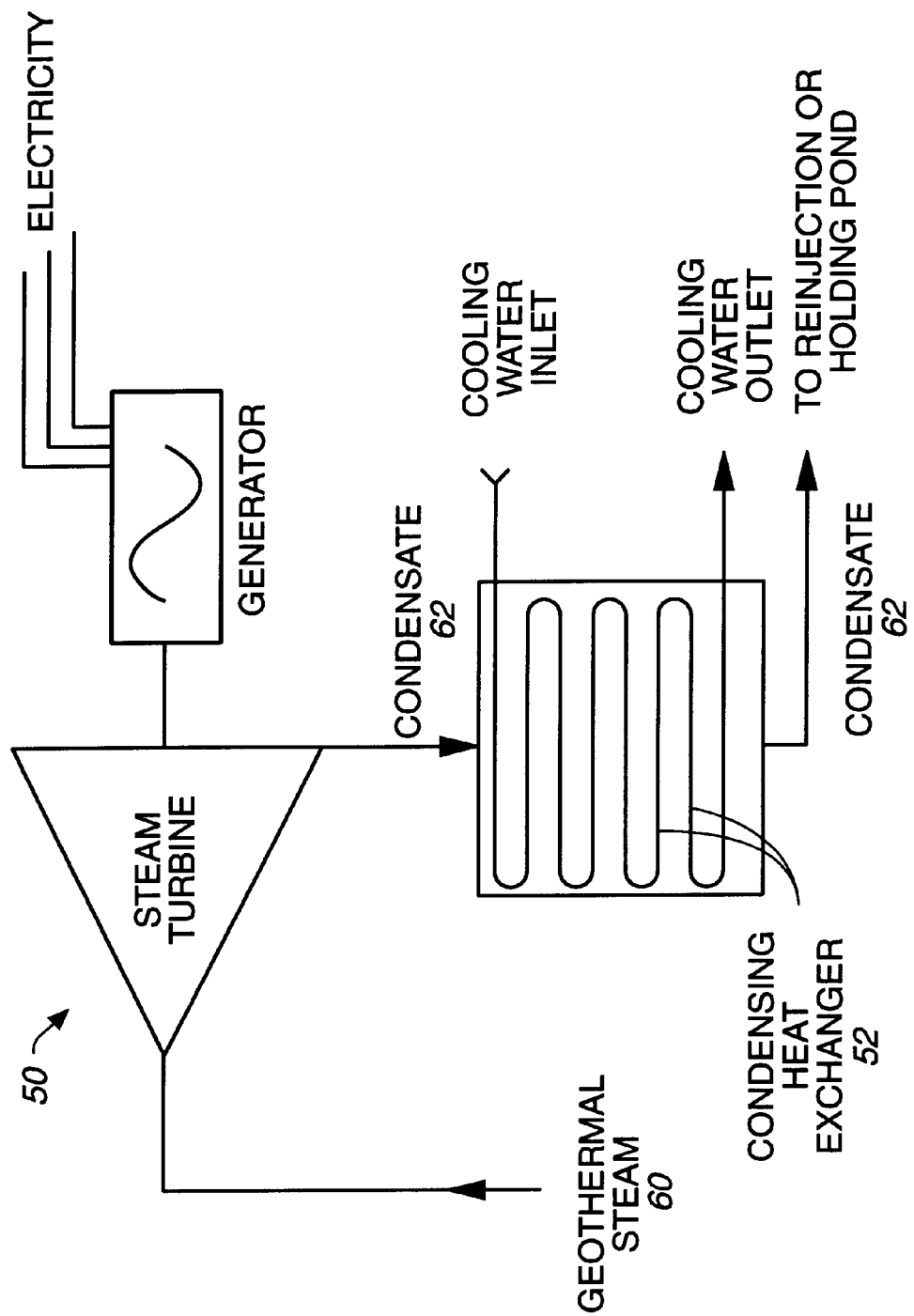
FIG._2

METHOD OF COMBINING WASTE WATER TREATMENT AND POWER GENERATION TECHNOLOGIES

This application is a continuation of application Ser. No. 08/545,110, filed Oct. 19, 1995.

FIELD OF THE INVENTION

Applicant's invention deals with the utilization of waste water effluent to revitalize a depleted geothermal field, and the combining of two power generation technologies to provide overall system efficiency gains.

The two generation technologies employed are geothermal power generation, where steam is obtained from thermal fields underneath the surface of the earth, and hydroelectric generation, where energy is extracted from movement of a volume of water due to gravitational force.

The waste water treatment phase of Applicant's invention capitalizes on the injection of municipal waste effluent into the strata of the geothermal field which supplies steam for power generation. Similar injection methods utilizing brine solutions have been employed historically to assist in the yield of geothermal steam. Such injection has been necessary to lower the mineral content of the geothermal steam and fluids. Lower temperature brine is mixed with high temperature, high mineral brine to reduce mineral content and reinjected into the field. In this case, waste effluent is injected into the strata to replenish lost water, not to lower mineral content. The water is recaptured as cooked water or geothermal steam which is utilized for power production and treated to yield potable water.

BACKGROUND OF THE INVENTION

Basic power generation technologies are generally grouped according to the energy source used to produce electricity. Fossil fuels such as coal, gas and oil are used to produce steam which is expanded through a steam turbine which, in turn, drives a generator thereby producing electric power. Fuels can also be combusted as in a gas turbine, where the primary energy source is hot gas which again expands and drives a generator. Nuclear power also uses a steam turbine-generator to convert steam produced by a nuclear reactor into power. In the case of geothermal power generation, steam naturally produced by the earth is extracted and processed to an extent, for expansion again, in a steam turbine-generator, although at much lower temperatures and pressures than the aforementioned fossil fuels. While the efficiencies associated with the geothermal steam are much lower than that of the traditional fossil fuels, the steam is essentially free, after the installed cost of the delivery infrastructure, compared to the cost of fossil fuel necessary to produce like amounts of steam. Solar power has also been used to boil water for steam as in Solar One, a plant near Dagget, Calif.

Technologies such as hydroelectric generation utilize the extraction of potential energy from water moved from higher elevations to lower elevations, using the rush of falling water through a "Francis" or "Kaplan" impulse turbine in order to turn a generator and produce electricity. There is no need to produce steam in such a system. The impinging force of the water acting on the water turbine provides the energy to be extracted.

While naturally occurring energy sources such as sunlight, or water are "free" they can vary in supply. In dry years, less hydroelectric generation is available. On cloudy days, less solar power can be generated. Where wind turbines are concerned, at least a mean wind velocity of 10 mph is required to justify installation, because if there is no wind, power is not produced. Similarly, geothermal fields finally expend their available steam, rendering the massive distribution system and generating equipment installed above the field useless. Utility companies and power associations have traditionally attempted to manage such systems: placing hydroelectric systems proximate to predictable watersheds and by building reservoirs; installing arrays of wind turbines in established zones of plentiful and predictable currents; building solar plants in desert locations etc.

Today, in an effort to increase generation thermal efficiencies, technologies are sometimes combined. The best and primary example of such a combination is steam and gas turbine technology. In such a system, a gas turbine is used to generate electricity, and concurrently, the exhaust gases, at nearly 950° F., are directed through a heat recovery boiler to produce steam which is then expanded through a traditional steam turbine-generator. This combination dramatically increases the overall thermal efficiency beyond that seen with either gas or steam technology separately.

The aforementioned combinations are typically not available in the naturally occurring energy resources.

Efforts to find other renewable energy sources to reduce dependence on fossil fuels have spawned alternate fuels including the burning of agricultural waste such as wood chips, almond shells and rice hulls to generate power. Used tires, municipal solid waste in the form of a screened mass or refuse-derived fuel have also provided fuel for power generation. In the case of municipal solid waste, the fuel has been exploited in large part to reduce the amount of waste sent to landfills. To say that the utilization of municipal wastes in the generation of electric power advances the common good would be an extreme understatement.

What is continually needed, then, are ways to extend or augment the availability of renewable or natural resources beyond traditional system efficiency improvements, in order to prolong available energy resources and reduce the dependency on fossil fuels. In conjunction, new methods of utilizing municipal waste and its byproducts are also necessary to ease the environmental impact of simple disposal, and to provide a cleaner environment.

In Sonoma County, Calif., the world's largest geothermal power generation project has been operating for decades. The geothermal field, called The Geysers, was developed by major oil companies, and the giant power generation utility Pacific Gas & Electric Company exploited the field for electric generation, installing several turbine generators, and leasing the resource field from the original developers. Other smaller utility companies have also leased portions of the field for production of electric power. Up to twenty-one units were installed over the years.

In the past decade, the pressure and volume of geothermal energy available in the Geysers field has lessened continually. Pacific Gas & Electric has closed several of the existing units and has curtailed production of others. Plans to retire existing units have been accelerated and staff has been reduced.

In the neighboring community of Santa Rosa, Sebastopol, Rohnert Park and Cotati, millions of gallons of effluent are produced in the local waste water treatment plant. Approximately 30 million gallons per day of effluent are produced in relatively close proximity to the Geysers.

The introduction of 30 million gallons per day of effluent would, over time, replenish the depleted steam resource of the Geysers. The infrastructure necessary to deliver this water to the Geysers will require a pipeline whose capital cost is not unlike that necessary to construct a penstock and/or dam for hydroelectric plants.

SUMMARY OF THE INVENTION

Applicant's invention comprises a novel combination which utilizes municipal waste water in such a way to revitalize a depleted geothermal field while also taking advantage of available terrain to combine hydroelectric and geothermal power generation technologies in a way never before attempted.

Waste water effluent provided by the local municipalities would be delivered to the Geysers via a pipeline. This effluent may be injected at various points in the geothermal field. Potential injection points include the existing wells which have been exhausted of their geothermal steam.

According to Applicant's process, once the geothermal steam has been expanded in the turbines for the production of electricity, the condensate is redirected to a holding pond for storage. The stored condensate is transported to lower elevations via a penstock where energy is extracted in the form of electricity by a hydroelectric turbine-generator.

The cost of pumping the water up the mountain is partially offset by the value of the power extracted in the same way as a typical "pump-storage" hydroelectric facility. In such a scheme, water is pumped uphill during off-peak periods when the value of power is low. The hydroelectric generation is accomplished during peak periods when the value of power is high, thereby providing a sound economic reason for pumping the water uphill in the first place.

BRIEF DESCRIPTION OF THE DRAWINGS

FIG. 1 is a line diagram of the steps of Applicant's method of employing waste water effluent in power generation technologies.

FIG. 2 is a schematic diagram of a steam turbine-generator and its connected cooling water and condenser system.

DETAILED DESCRIPTION OF THE INVENTION

A sewage treatment plant 10 provides effluent 5, for use in the geyser steam field 20, located at site 30. Also located at site 30 are the following components, as shown in FIG. 1: the steam turbine 50, the heat exchange system 52, the holding pond 46, the inlet to the penstock 44, and the piping system for carrying condensate 62, effluent 5, steam 60 and cooked water 64 as described below.

The effluent 5 is piped through a plurality of pumps 15 to site 30 where it is routed one of several directions. The effluent may be injected directly into the aquifer, or geothermal strata 40, located deep below the surface of the site 30, or into the heat exhanger system 52, for use as a cooling medium. After use as a cooling medium in heat exchanger system 52, the effluent 5 is injected into the geothermal strata 40. From the geothermal strata 40, geothermal steam 60 is extracted through its own distribution to the steam turbine-generator 50, where it is expanded and condensed to produce electricity. From the steam turbine 50, the condensate 62 is piped either to a holding pond 46, or to the geothermal strata where it is reinjected. Any fraction of the condensate may be reinjected into the aquifer 40, or directed to the holding pond 46. The holding pond 46 stores condensate 62, for further use. Cooked water 64, also extracted from the geothermal strata 40, is also piped to the holding pond 46.

The cooked water 64 is introduced into the holding pond 46, sufficiently below its surface to avoid any contamination of the air due to vapors effected by contact with the geothermal strata 40. The holding pond 46 provides the needed volume and pressure to be useful when directed down penstock 44, to the inlet of the hydroelectric generator 70, where the potential energy is extracted in the form of electricity. After flowing through the hydroelectric generator 70, the condensate 62, and cooked water 64 are processed in water treatment system 80, consisting of filtration and chemical treatment to remove sulphur, arsenic, iron and dissolved solids. No organic contamination will exist after injection and recapture as steam or cooked water.

In another embodiment of the present invention, treatment of the fractions of cooked water 64 and condensate 62 to be directed to the holding pond may first be treated to produce potable water, thereby eliminating potential problems stemming from a contaminated holding pond. The potable water may then either be held and distributed for public consumption or directed down penstock 44 to extract the potential energy in a hydroelectric turbine-generator 70.

Steam turbine-generators 50 employ cooling water for a variety of reasons, but a chief application is in the condensing heat exchanger 52, which is flexibly connected to the exhaust of the steam turbine 50, as shown in FIG. 2, and which usually receives its cooling water from a cooling tower. It is possible that traditional cooling towers may be reduced in size or even eliminated by using the large volume of available effluent for cooling. The condensing heat exchanger 52 creates a relative vacuum in the low pressure stages of the turbine-generator 50, helping the expansion of the steam 60 through the system.

While the invention has been described in connection with what is presently considered the most practical and preferred embodiment(s), it is to be understood that the invention is not limited to the disclosed embodiment(s) but, on the contrary is intended to cover various modifications and equivalent arrangements included within the scope of the appended claims.

What is claimed is:

1. A method of employing waste water effluent in power generation comprising the steps of:

delivering waste water effluent to a geothermal steam field;

injecting said effluent into said field;

collecting steam from said field;

extracting energy in the form of electricity from said steam by expansion in a steam turbine-generator system; and utilizing said effluent as cooling water in a condensing heat exchanger of said steam turbine-generator system thereby producing condensate.

2. A method according to claim 1 further comprising the step of:

pumping said effluent to said geothermal steam field through a piping system.

3. A method according to claim 2 wherein:

said pumping is performed in at least one stage.

4. A method of employing waste water effluent in power generation comprising the steps of:

delivering waste water effluent to a geothermal steam field;

injecting said effluent into said field;

collecting steam from said field;

extracting energy in the form of electricity from said steam by expansion in a steam turbine-generator system thereby producing condensate; and reinjecting at least a fraction of said condensate into said geothermal steam field.

5. A method according to claim 4 further comprising the step of:

pumping said effluent to said geothermal steam field through a piping system.

6. A method according to claim 5 wherein:

said pumping is performed in at least one stage.

7. A method according to claim 4 wherein said step of injecting said effluent into said field comprises injecting said effluent into at least one existing well which has been substantially exhausted of geothermal steam.

8. A method of employing waste water effluent in power generation comprising the steps of:

delivering waste water effluent to a geothermal steam field;

injecting said effluent into said field;

collecting steam from said field;

extracting energy in the form of electricity from said steam by expansion in a steam turbine-generator system thereby producing condensate; and directing at least a fraction of said condensate to a lower elevation by force of gravity, through a hydroelectric turbine-generator, extracting energy in the form of electricity.

9. A method according to claim 8 further comprising the step of:

directing at least a fraction of said condensate from said steam turbine-generator to a holding pond.

10. A method according to claim 9 further comprising the step of:

treating said condensate exiting said hydroelectric turbine-generator to produce potable water.

11. A method according to claim 8 further comprising the steps of:

collecting cooked water from said field; and directing cooked water to said lower elevation by force of gravity, through said hydroelectric turbine-generator, extracting energy in the form of electricity.

12. A method of employing waste water effluent in power generation comprising the steps of:

delivering waste water effluent to a geothermal steam field, said delivery including at least one stage of pumping said effluent through a piping system;

injecting said effluent into said field;

collecting steam from said field;

extracting energy in the form of electricity from said steam by expansion in a steam turbine-generator system thereby producing condensate, said effluent being utilized as cooling water in said turbine-generator's condensing heat exchanger;

reinjecting a fraction of said condensate into said geothermal steam field;

directing a fraction of said concentrate to a lower elevation by force of gravity in a penstock, directing said condensate through a hydroelectric turbine-generator, extracting energy in the form of electricity;

directing a fraction of said condensate from said steam turbine-generator to a holding pond; and treating a fraction of said condensate producing potable water.

13. A method according to claim 12 wherein:

said pumping of said effluent takes place during off-peak periods of electricity consumption; and said hydroelectric generation is accomplished during peak periods of electricity consumption.

14. A method according to claim 12 further comprising the step of:

distributing said potable water for public consumption.

15. A method of employing waste water effluent in power generation comprising the steps of:

delivering waste water effluent to a geothermal steam field;

injecting at least a fraction of said effluent into said field;

collecting steam and cooked water from said field;

extracting energy in the form of electricity from said steam by expansion in a steam turbine-generator system thereby producing condensate;

directing at least a fraction of said condensate and said cooked water to a lower elevation by force of gravity in a penstock through a hydroelectric turbine-generator, thereby extracting energy in the form of electricity;

treating at least a fraction of said condensate and said cooked water to produce potable water; and distributing said potable water for public consumption.

16. The method of claim 15 further comprising the step of:

said delivery of said effluent to said field taking place during off-peak periods of electricity consumption; and said hydroelectric power generation taking place during peak periods of electricity consumption.

* * * * *